United States Patent [19]

Prendel et al.

[11] Patent Number: 5,340,162
[45] Date of Patent: Aug. 23, 1994

[54] INTERFERENCE NUT RETENTION SYSTEM

[75] Inventors: Troy A. Prendel; Leo Meredith, both of Jackson, Mich.

[73] Assignee: Aeroquip Corporation, Jackson, Mich.

[21] Appl. No.: 100,450

[22] Filed: Aug. 2, 1993

[51] Int. Cl.⁵ .............................................. F16L 35/00
[52] U.S. Cl. .................................. 285/81; 285/89; 285/110; 285/328; 285/354
[58] Field of Search ................. 285/354, 386, 110, 81, 285/89, 328

[56] References Cited

U.S. PATENT DOCUMENTS

| | | | |
|---|---|---|---|
| 904,673 | 11/1908 | Bideker | 285/89 X |
| 1,702,943 | 2/1929 | La Londe | 285/89 X |
| 2,547,889 | 4/1951 | Richardson | 285/354 X |
| 3,672,704 | 6/1972 | Christianson | 285/110 |
| 4,452,473 | 6/1984 | Ruschke | 285/386 X |
| 4,750,765 | 6/1988 | Cassidy et al. | 285/354 X |
| 4,848,807 | 7/1989 | Christianson | 285/110 |
| 4,889,368 | 12/1989 | Laipply | 285/354 X |
| 5,002,316 | 3/1991 | Chohan | 285/110 |
| 5,083,818 | 1/1992 | Schoot | 285/81 |

FOREIGN PATENT DOCUMENTS

| | | | |
|---|---|---|---|
| 687981 | 6/1964 | Canada | 285/110 |
| 686387 | 1/1953 | United Kingdom | 285/110 |
| 1225427 | 3/1971 | United Kingdom | 285/110 |

*Primary Examiner*—Randolph A. Reese
*Assistant Examiner*—Heather Chun
*Attorney, Agent, or Firm*—Beaman & Beaman

[57] ABSTRACT

A nut retention system for nut connected couplings including an end fitting having an outer end wherein interfering abutments are defined upon the end fitting and nut to limit retraction of the nut on the end fitting when the coupling is disconnected whereby the outer end of the nut will always axially extend beyond the outer end of the end fitting to protect the end fitting outer end and seal located thereon.

4 Claims, 1 Drawing Sheet

INTERFERENCE NUT RETENTION SYSTEM

BACKGROUND OF THE INVENTION

1. Field Of the Invention

The invention pertains to nut connected couplings wherein a nut is rotatably mounted upon an end fitting for attachment of the end fitting upon a threaded adapter.

2. Description of the Related Art

The invention relates to a fluid coupling for connection to a flat face adapter wherein the adapter includes an outer sealing end surface, such end surface often being flat and radial. The coupling includes an end fitting having an outer surface having sealing means integral therewith, or associated therewith, such as an O-ring. An annular nut, rotatably mounted upon the end fitting includes a radial shoulder adapted to engage the nut radial shoulder, and the outer end of the nut is threaded, usually internally, whereby the nut may be threaded upon the adapter threads. As the nut is tightened the end fitting outer end is axially forced against the adapter outer end establishing a sealed fluid conducting relationship between the end fitting and the adapter. A typical connection of this type is shown in the assignee's U.S. Pat. No. 4,848,807 wherein a beam type lip seal is integrally defined upon the end fitting outer end for establishing a sealed relationship to the adapter outer end.

Couplings having integral sealing structure, such as a beam lip seal, are susceptible to seal damage when the coupling is uncoupled from an adapter. The coupling nut, when not threaded to an adapter, is free to axially move along the end fitting, and associated conduit, away from the end fitting outer end, and as the conduit and associated coupling are handled, moved, or otherwise manipulated the end fitting outer end and seal are totally exposed and will be damaged if engaged with a hard object. As metal sealing structure such as a beam lip seal is very accurately formed and the integrity of the lip seal surfaces is critical to establishing an effective seal, even a small nick or scratch occurring in the lip seal will prevent an effective fluid tight connection from being established between the end fitting and the adapter.

In the past, the ends of end fittings having beam lip seals, or the like, defined thereon, have been protected by removable caps, or the end of the end fitting may be dipped within a plastisol or other thick protective material which will harden. Such secondary protective procedures are expensive to apply, and require removal prior to use of the coupling. Further, a cap may be accidentally removed or knocked from the end fitting outer end exposing the seal.

OBJECTS OF THE INVENTION

It is an object of the invention to provide a nut retention system for nut connected couplings wherein retraction of the nut when the coupling is in the uncoupled condition is limited such that the outer end of the nut extends beyond the outer end of the associated end fitting to protect the end fitting outer end from damage.

A further object of the invention is to provide a nut retention system for nut connected couplings wherein the connector nut rotatably mounted upon an end fitting is axially displaceable upon the end fitting within limits for connecting the end fitting to an adapter in a normal manner, and retraction of the nut upon the end fitting is limited by the positive engagement of abutments defined upon the end fitting and nut.

A further object of the invention is to provide a nut retention system for fluid couplings having a nut rotatably mounted upon an end fitting wherein abutments are formed upon the end fitting and nut to limit retraction of the nut on the end fitting, and the axial distance between the abutment defined on the nut and the nut outer end is greater than the axial distance between the end fitting abutment and the end fitting outer end whereby the outer end of the nut will always axially extend beyond the end fitting outer end thereby protecting the end fitting outer end and any sealing structure defined thereon.

An additional object of the invention is to provide a nut retention system for fluid couplings using a nut connector wherein interfering abutments formed upon the coupling end fitting and nut limit retraction of the nut on the end fitting, and abutments defined on the end fitting and nut are dimensioned with an interference fit wherein, during assembly, the nut mounted abutment may be forced over the end fitting abutment, and thereafter, the abutments will engage to limit axial movement between the nut and end fitting.

Yet another object of the invention is to provide a nut retention system for nut connected fluid couplings wherein the retention system is incorporated into the dimensions of the normal coupling components and requires no additional size either axially or radially to the coupling as compared to a conventional non-nut retention coupling.

SUMMARY OF THE INVENTION

The invention relates to nut connected couplings particularly suitable for attachment to adapters having a flat radial sealing surface, but the inventive concept is not limited to a coupling for use with this particular type of adapter. The inventive concepts have advantage in any type of nut connected coupling wherein there is a desire to protect the end of the end fitting.

A coupling end fitting, by way of illustration, includes a beam lip seal at its outer end, and by the use of a nut the radial shoulder of the end fitting is engaged by the nut shoulder whereby tightening of the nut forces the end fitting outer end into a sealed relationship with the adapter outer end upon which the nut is being threaded.

An annular abutment in the form of an outwardly projecting rib is defined upon the coupling end fitting axially spaced inwardly from the end fitting outer end. A second annular abutment rib radially extending inwardly is formed upon an inner surface of the nut. The outer diameter of the rib formed on the end fitting is slightly greater, by an interference fit, than the inner diameter of the nut mounted abutment, and when assembling the nut upon the coupling end fitting the end fitting and nut must be placed within an arbor press wherein the nut is forced in an axial direction toward the end fitting outer end over the end fitting rib. Further movement of the nut relative to the end fitting in an extended direction is limited by engagement of the radial shoulders formed on the end fitting and nut. Once mounted upon the end fitting, axial movement of the nut on the end fitting in the nut retraction direction is limited by engagement of the rib abutments.

The axial distance between the end fitting rib and the end fitting outer end and seal is less than the axial distance between the nut rib abutment and the outer end of the nut. Accordingly, even with the nut fully retracted on the end fitting, the outer end of the nut will axially extend beyond the outer end of the end fitting, and in this manner the nut outer end will protect the end fitting outer end against damage when the coupling is disconnected.

In that the rib abutments are small, and incorporated into the usual configuration of the coupling, their presence adds nothing to the overall dimension or radial size of the coupling, and the nut retention system of the invention is economical to manufacture, assemble and use.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
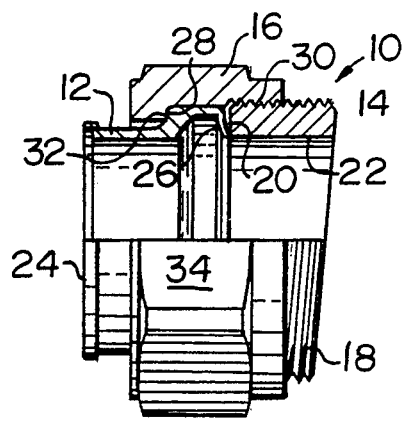
FIG. 1 is an elevational, partially sectioned view of a typical prior art nut connected coupling wherein no nut retention structure is employed.

A typical prior art fluid coupling over which the instant invention is an improvement is shown in FIG. 1. This type of coupling 10 includes a tubular end fitting 12 which is axially aligned with and sealingly connected to an exteriorly threaded adapter 14 by an annular nut 16 axially displaceable and rotatable on the end fitting 12. The adapter 14 is a part of a larger fluid system, not shown, and is exteriorly threaded at 18. The adapter includes an outer sealing face 20, and in the disclosed embodiment the sealing face 20 is flat and radial. Fluid is conducted through the adapter 14 through the central bore 22.

The end fitting 12 includes an inner end 24 which is connected to a conduit system, such as a flexible hose or rigid conduit, not shown, by conventional structure. The outer end of the end fitting 12 includes a beam lip seal 26 which engages with the adapter face 20, and the end fitting includes a radially extending shoulder 28 for engagement by the nut 16. The nut 16 includes threads 30 adapted to mate with the adapter threads 18, and the nut shoulder 32 engages the end fitting shoulder 28 whereby rotation of the nut 16 by a wrench applied to the nut flats 34 will axially draw the end fitting 12 and the adapter 14 toward each other engaging the adapter face 20 with the end fitting seal 26 to establish a tight metal-to-metal sealed relationship between the end fitting and adapter. This type of prior art coupling is shown in the assignee's U.S. Pat. No. 4,848,807.

Prior art couplings of the type shown in FIG. 1 have the disadvantage that when the nut 16 is disengaged from the adapter 14 the nut 36 is free to move to the left with respect to the end fitting 12 in an unlimited manner. Once the outer end of the nut 16 has moved to the left beyond the seal 26 the outer end of the end fitting and the seal 26 are exposed and susceptible to damage as the coupling 10 is handled, stored, or otherwise manipulated.

A coupling of the general type shown in FIG. 1, but incorporating the advantages of the invention, is shown in FIGS. 2-6. In the invention, the end fitting 36 includes an outer end 38 upon which a seal, such as the beam seal 40 may be defined. The inner end of the end fitting 36 is represented at 42, and may be connected to a hose, conduit, or the like as is well known, but not shown.

The end fitting 36 includes a cylindrical surface 44 basically constituting the maximum dimension of the end fitting 36, and the end fitting includes a radially disposed shoulder 46 for cooperation with the nut shoulder, as later described.

The nut 48 is similar to the nut 16 previously described having an outer end 50 and internal threads at 52 adjacent the outer end for attachment to an adapter, not shown. The nut inner end 54 is disposed toward the conduit associated with end fitting 36, and the nut 48 includes a cylindrical inwardly facing surface 56 as will be appreciated from FIGS. 4 and 6. Also, the nut 48 includes a radial shoulder 58 in axial alignment with the end fitting shoulder 46.

Figure 4:
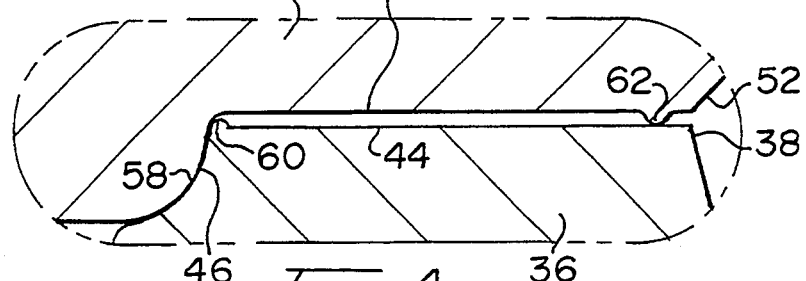
FIG. 4 is an enlarged detail elevational sectional view illustrating the relationship of the end fitting and nut abutments when the components are in the relationship of FIG. 3.
Figure 6:
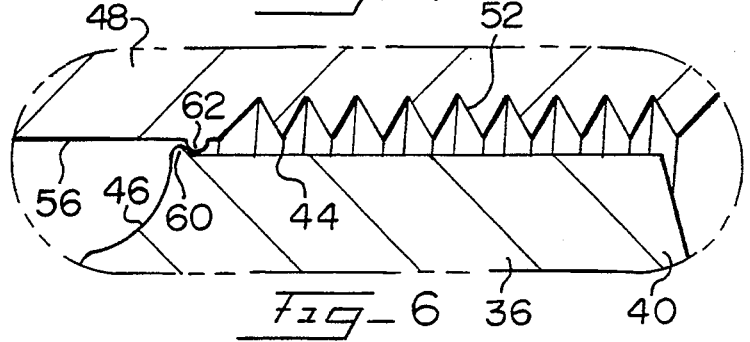
FIG. 6 is an enlarged detail elevational view illustrating engagement of the end fitting and nut abutments limiting nut retraction as illustrated in FIG. 5.

To provide the desired nut retention, an annular abutment in the form of a rib 60, FIGS. 4 and 6, radially extends outwardly from the end fitting surface 44 adjacent the intersection with the shoulder 46. Preferably, the rib abutment 60 has a rounded configuration as will be appreciated from the drawings, and the maximum radial dimension of the crown of the rib 60 is less than the radial dimension of the nut surface 56.

The nut 48 is provided with an inwardly projecting rib abutment 62 which inwardly projects from the nut surface 56 as will be appreciated from FIGS. 4 and 6. The innermost radial dimension of the rib 62 is less than the radial dimension of the end fitting surface 44, and there is only incidental engagement between the rib 62 and the surface 44 during axial displacement of the nut on the end fitting. Preferably, the rib 62 is located upon the nut surface 56 adjacent the innermost portion of the nut threads 52.

The maximum radial dimension of the rib abutment 60 is a few thousandths greater than the minimum radial dimension of the rib abutment 62. Accordingly, the rib abutments 60 and 62 are in axial alignment and will engage each other in an abutment relationship as shown in FIG. 6 to limit axial displacement of the nut 48 on the end fitting 36 in a nut retraction direction as may occur when the coupling is uncoupled. Accordingly, the nut 48 may move to the left with respect to the end fitting 36 until the rib abutments 60 and 62 engage, FIG. 6, and movement of the nut 48 to the right with respect to the end fitting 36, FIG. 4, is limited by engagement of the shoulders 46 and 58 which occurs as the nut 48 is being threaded upon an adapter, not shown, and the coupling is being connected to an adapter.

Figure 5:
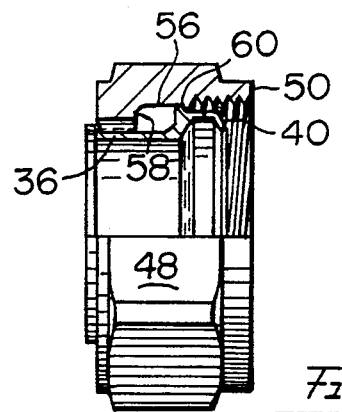
FIG. 5 is an elevational, partially sectioned view illustrating the coupling components with the nut in the fully retracted position.

The axial dimension between the rib abutment 60 and the seal 40 on the end fitting is significantly less than the axial dimension between the rib abutment 62 and the nut outer end 50, as will be appreciated from FIGS. 5 and 6. Accordingly, when the ribs 60 and 62 are in engagement as in FIG. 6, the nut end 50 is axially extending well beyond the beam seal 40 and the end fitting outer end 38 such that the nut outer end 50 will provide an effective protection of the end fitting outer end and seal 40 against inadvertent damage to the seal as the coupling is handled. Preferably, when in the fully retracted position shown in FIGS. 5 and 6, the extension of the nut end 50 beyond the seal 40 is such as to protect the seal except against all objects except those directly entering the nut outer end.

Figure 2:
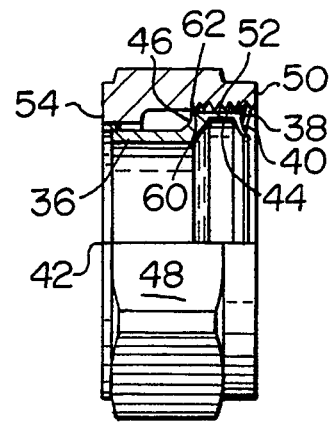
FIG. 2 is an elevational, partially sectioned view of a coupling in accord with the invention illustrating the relationship of the end fitting and nut prior to full assembly thereof to a nut retention relationship.
Figure 3:
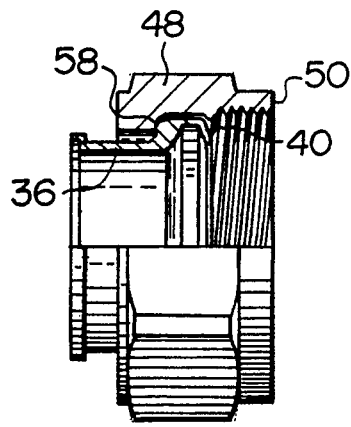
FIG. 3 is an elevational, partially sectioned view of a fluid coupling in accord with the invention illustrating the coupling components in the relationship occurring when the nut is extended on the end fitting, such as when fully connected to an adapter, not shown.

Assembly of the nut 48 upon the end fitting 36 is illustrated in FIG. 2. Initially, the nut 48 is positioned to the left of end fitting 36 as shown in FIG. 2, and as the innermost radial dimension of the threads 52 is greater than the outer diameter of the rib 60 the nut 48 may be inserted on the end fitting 36 from the left until the rib 62 engages the left side of the rib 60, which is the relationship shown in FIG. 2. Thereupon, the end fitting and nut are placed within an arbor press, and the nut is forced over the rib abutment 60 such that the rib 62 will ride over the rib 60, and once thereover the normal dimensions of the ribs 60 and 62 will reestablish to produce the abutting relationship shown in FIG. 6. During conventional use, sufficient axial forces imposed upon the end fitting 36 and nut 48 toward the nut retraction direction are insufficient to cause the abutment 62 to ride over the rib 60, and the ribs 60 and 62 provide an effective limit to the relative axial movement of the end fitting and nut.

As the rib abutments 60 and 62 are incorporated into the configuration of the coupling, and are very small, only amounting to a few thousandths of an inch in radial dimensions, when compared to the associated surfaces 44 and 56, the nut retention system of the invention does not add to the overall size and configuration of the coupling, and the inventive concepts may be economically practiced in that the rib abutments 60 and 62 may be rapidly formed by known machining techniques.

It is appreciated that various modifications to the inventive concepts may be apparent to those skilled in the art without departing from the spirit and scope of the invention.

We claim:

1. A nut retention system for couplings having a tubular end fitting including an axis, an outer axial end, a circumferential outer surface defining the end fitting primary maximum radial circumferential dimension and a radially extending shoulder facing away from the outer axial end, and an annular nut rotatably circumscribing the end fitting having an axis, a threaded outer axial end and a radially extending shoulder adapted to engage the fitting shoulder, the nut being axially displaceable upon the end fitting between a retracted uncoupled position and an extended coupled position, the improvement comprising, a first abutment defined on the end fitting axially spaced from the end fitting outer axial end, a second abutment defined on the nut axially spaced from the nut outer axial end, said first and second abutments engaging upon axially displacing the nut upon the end fitting to the fully retracted uncoupled position, the axial distance of said first abutment to the end fitting outer axial end being less than the axial distance from said second abutment to the nut outer axial end whereby the nut outer axial end axially projects beyond the end fitting outer axial end when the nut is in the fully retracted position to protect the end fitting outer axial end when the coupling is uncoupled, said first abutment comprising a first annular rib radially projecting outward from the end fitting circumferential outer surface having a maximum outer diameter, said second abutment comprising a second annular rib radially projecting inwardly toward the end fitting circumferential outer surface having a minimum inner diameter, said first rib maximum diameter being slightly greater than said second rib minimum diameter whereby the nut and said second rib may be axially displaced over said first rib in an interference fit to mount the nut upon the end fitting.

2. In combination, a tubular end fitting having an axis, an outer axial end, a circumference defined by a circumferential outer surface and a radially extending shoulder axially spaced from said outer axial end, a seal defined on said outer axial end, a compression nut circumscribing said end fitting and axially displaceable thereon having an axis, a threaded outer axial end and a radially extending shoulder axially spaced from said threaded outer axial end adapted to engage the end fitting shoulder, said nut being axially displaceable on said end fitting between a retracted uncoupled position and an extended coupled position limited by engagement of said shoulders, an annular outwardly extending first rib defined on said end fitting circumference having an outer diameter, an annular inwardly extending second rib defined on said nut having an inner diameter, said first rib outer diameter being slightly greater than said second rib inner diameter whereby said second rib may be axially forced over said first rib with an interference fit, the axial distance from said first rib to the outer axial end of said end fitting being less than the axial distance from said second rib to said nut outer axial end whereby said ribs engage to limit axial displacement of said nut upon said end fitting when in said nut fully retracted uncoupled position and said nut outer axial end axially extends beyond said end fitting outer axial end to protect said end fitting outer axial end.

3. In a combination as in claim 2, a sealing structure defined upon said end fitting outer axial end.

4. In a combination as in claim 3, said threads defined on said nut outer axial end comprising internal threads.

* * * * *